(12) United States Patent
Fry et al.

(10) Patent No.: US 8,336,012 B2
(45) Date of Patent: Dec. 18, 2012

(54) AUTOMATED TIMING OPTIMIZATION

(75) Inventors: Randall P. Fry, Greenville, NC (US); Michael A. MInter, Bowling Green, KY (US)

(73) Assignee: LSI Corporation, Milpitas, CA (US)

( * ) Notice: Subject to any disclaimer, the term of this patent is extended or adjusted under 35 U.S.C. 154(b) by 204 days.

(21) Appl. No.: 12/421,198

(22) Filed: Apr. 9, 2009

(65) Prior Publication Data
US 2010/0262941 A1 Oct. 14, 2010

(51) Int. Cl.
*G06F 9/455* (2006.01)
*G06F 17/50* (2006.01)

(52) U.S. Cl. ........ 716/113; 716/108; 716/111; 716/112; 716/134; 703/19

(58) Field of Classification Search ............ 716/106, 716/108, 111–114, 132, 134; 703/19
See application file for complete search history.

(56) References Cited

U.S. PATENT DOCUMENTS

| | | | | |
|---|---|---|---|---|
| 6,550,044 B1 * | 4/2003 | Pavisic et al. | | 716/114 |
| 2003/0014724 A1 * | 1/2003 | Kojima et al. | | 716/10 |
| 2008/0250371 A1 * | 10/2008 | Uchino et al. | | 716/6 |
| 2009/0070715 A1 * | 3/2009 | Curtin et al. | | 716/2 |
| 2009/0094565 A1 * | 4/2009 | Lackey et al. | | 716/2 |

OTHER PUBLICATIONS

"Ecounter Design Flow Guide and Tutorial Product Version 3.2", by Cadence, @ Sep. 2003.*

* cited by examiner

*Primary Examiner* — Nha Nguyen
(74) *Attorney, Agent, or Firm* — Luedeka Neely Group, P.C.

(57) ABSTRACT

A method for reducing a timing violation in a negative slack path from an integrated circuit design, by identifying the negative slack path in the integrated circuit design with a processor, and then identifying positive slack paths by determining timing slack for the paths that are disposed before and after the negative slack path. A prediction is made as to whether margin can be obtained from the positive slack paths by performing additional timing optimization on the positive slack paths, and it is determined whether that margin is sufficient to reduce the timing violation to at least a desired level. If the margin is sufficient, then additional timing optimization is performed on the positive slack paths, and the margin is used to manipulate the clock skew and reduce the timing violation on the negative slack path.

1 Claim, 1 Drawing Sheet

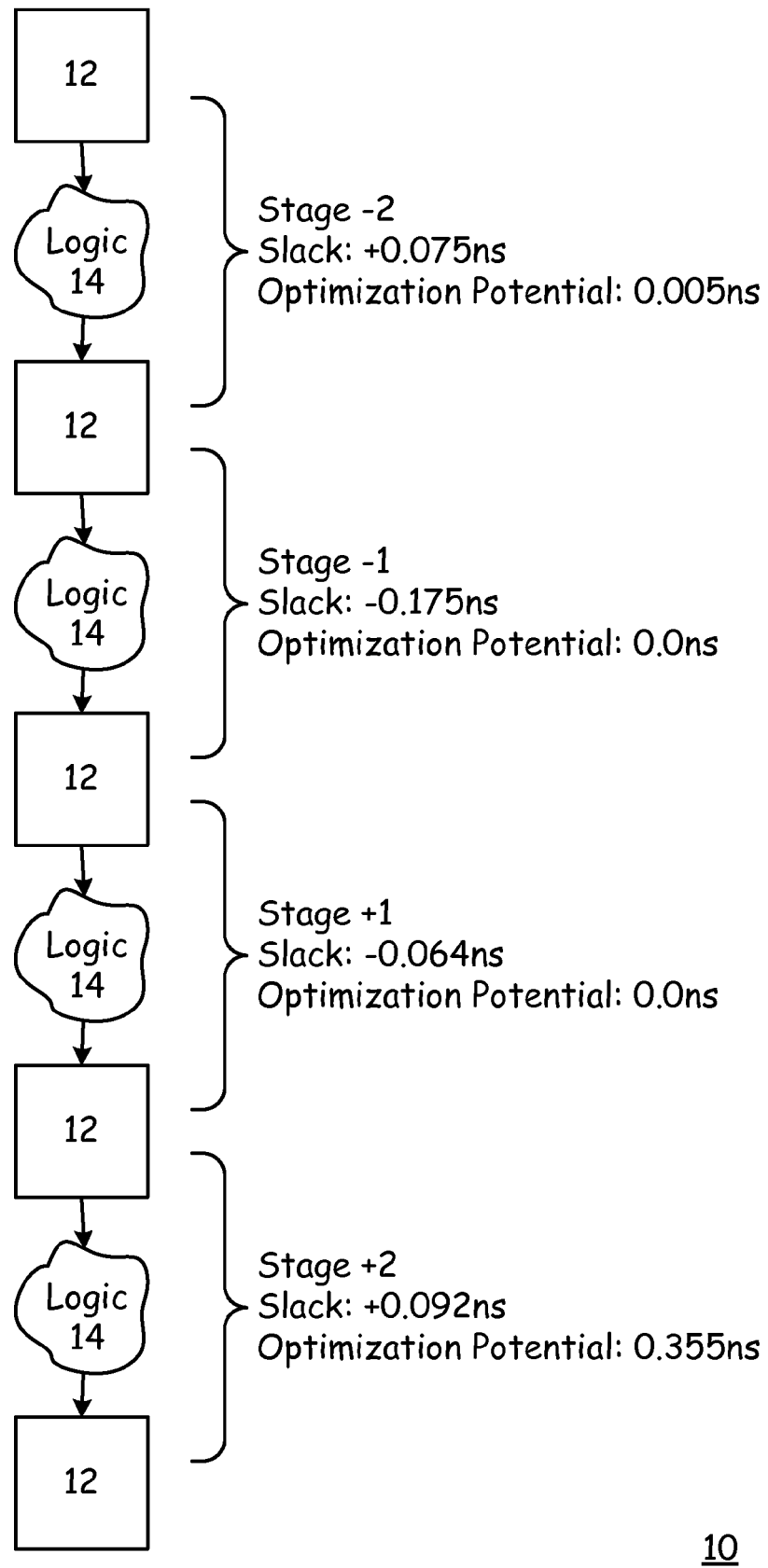

AUTOMATED TIMING OPTIMIZATION

FIELD

This invention relates to the field of integrated circuit design. More particularly, this invention relates to timing optimization for integrated circuit designs.

BACKGROUND

Before an integrated circuit can be fabricated, a design for the integrated circuit must be created. This design is more than just a basic circuit diagram that depicts which elements are connected to which, and how they are connected. The integrated circuit design as contemplated herein includes lay-out of the circuit, timing analysis, and a broad array of other information about performance of the individual elements from which the design is constructed, and the overall performance of the integrated circuit that will be constructed according to the design. The integrated circuit design that is created is a physical object, embodied as one or more specification on paper, or more likely, data encoded on a computer readable medium. The data can be acted upon by a processor to produce mask sets for photolithography, and create programs for the processing equipment to run during fabrication of the integrated circuit.

As the term is used herein, "integrated circuit" includes devices such as those formed on monolithic semiconducting substrates, such as those formed of group IV materials like silicon or germanium, or group III-V compounds like gallium arsenide, or mixtures of such materials. The term includes all types of devices formed, such as memory and logic, and all designs of such devices, such as MOS and bipolar. The term also comprehends applications such as flat panel displays, solar cells, and charge coupled devices.

Frequently, a design for an integrated circuit that appears timing-clean after logical synthesis can actually have a multitude of timing issues after it is taken into physical design, where physical effects are taken into account. These physical effects include—but are not limited to—the size of the die, floorplan layout, clock skew, congested areas, and so forth.

One method to resolve this issue is to force the synthesis stage of the design process to perform additional analysis on all of the paths of the integrated circuit design, and build additional margin into an entire group of paths from the very beginning. The great disadvantage of this approach, however, is that integrated circuit design that is produced in this manner is much larger and consumes more power than is necessary. This results in costly die-size growth and violations of the power budget.

What is needed, therefore, is a system that overcomes problems such as those described above, at least in part.

SUMMARY

The above and other needs are met by a method for reducing a timing violation in a negative slack path from an integrated circuit design, by identifying the negative slack path in the integrated circuit design with a processor, and then identifying positive slack paths by determining timing slack for the paths that are disposed before and after the negative slack path. A prediction is made as to whether margin can be obtained from the positive slack paths by performing additional timing optimization on the positive slack paths, and it is determined whether that margin is sufficient to reduce the timing violation to at least a desired level. If the margin is sufficient, then additional timing optimization is performed on the positive slack paths, and the margin is used to manipulate the clock skew and reduce the timing violation on the negative slack path.

In this manner, the various embodiments of the present invention robustly and automatically analyze timing violations, detect potential timing margin on either side of the violating path (but not limited to the paths immediately adjacent to the violating endpoint cell), and optimize those paths accordingly with very little, if any, manual effort by the user. This approach optimizes only those positive slack paths necessary to yield useful skew opportunities, thus resulting in a power and design growth sensitive solution. Once the paths are optimized, the physical design tools can eliminate or further reduce the timing violations by leveraging skew techniques.

In various embodiments, the step of predicting if margin can be obtained from a positive slack path is accomplished by analyzing at least one of: number of cells in the path, types of cells in the path, fanout at each cell input/output pin in the path, drive strength of cells in the path, propagation delay across cells, interconnect delay on nets in the path, maximum delay threshold of cells in the path, and maximum net delay threshold.

BRIEF DESCRIPTION OF THE DRAWINGS

Further advantages of the invention are apparent by reference to the detailed description when considered in conjunction with the figure, which is not to scale so as to more clearly show the details, wherein like reference numbers indicate like elements, and which depicts a functional block diagram of some paths and their associated timing in an integrated circuit design 10, which are used as an example of a method according to one embodiment of the present invention.

DETAILED DESCRIPTION

In some instances, inspecting the paths on either side of a violating endpoint (such as a register, for example) for characteristics such as path structure, drive strengths of the cells in the path, and the propagation delays across each cell in the path, positive-slack paths can be further optimized, thereby providing additional timing margin that can be borrowed to relieve the timing violation on the endpoint in question. This additional margin can be used by deliberately skewing the clock arrival times to the registers which, in effect, provides more time to the path that is violating the timing than the clock period would normally provide, without violating other paths or requiring additional pipeline stages.

This process involves addressing all of these different types of violations one by one (and there can be thousands of them) to determine whether the potential for additional timing optimization exists on either side of the violating endpoint, then determining whether the timing potential offers enough margin to solve the timing violation in question, then optimizing the paths that have such additional timing margin, and then running the tools that take advantage of the useful skew.

The main steps involved in implementing a method according to an embodiment of the present invention are given below. First, identify a negative-slack (violating) path in the design. Second, determine the timing slack (margin) on the paths that are disposed both before and after the violating path.

Third, determine if any additional margin can be obtained from the paths identified in the second step, if further timing optimization was performed on those paths. This can be done by looking at the structure of the paths (number of cells in the path, cell types used, fanout at each cell input/output pin, and so forth), the drive strength of the cells used in the path, and the propagation delay across the cells, as well as the interconnect delay on the nets in the path. Based on a variety of criteria, historical data with the given technology, user defined maximum cell and net delay thresholds, and so forth a reasonable estimation of the optimization potential can be derived.

Fourth, determine if the optimization potential on the paths before or after the violating path is enough to warrant moving forward with the optimization steps for those paths. Fifth, further optimize those positive slack paths that have the desired optimization potential in order to add additional positive margin (slack) to those paths. Sixth, run appropriate tools to manipulate clock skew in order to capitalize on the newly available timing margin on the positive-slack paths in order to eliminate or further reduce the negative-slack timing on the violating path.

With reference now to the figure, there is depicted a functional block diagram of some paths (stages), including input/outputs 12 and logic 14, and their associated timing in an integrated circuit design 10, which are used as an example of a method according to one embodiment of the present invention. Although stage +2 in the figure only has 92 picoseconds of positive slack, further investigation reveals that this is because it was not rigorously optimized during logical synthesis. In fact, there are 355 picoseconds of margin that can be gained just from this path, by applying more aggressive settings to the synthesis/physical optimization tools. The margin gained is then leveraged via placement and skew strategies to reduce the timing issues at stage −1 and stage +1.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for reducing a timing violation in a negative slack path from an integrated circuit design, the method comprising the steps of:

identify the negative slack path in the integrated circuit design with a processor, identify positive slack paths by determining timing slack for paths disposed before and after the negative slack path, predict if whether performing additional timing optimization on the positive slack paths will produce additional margin on top of margin already available from the positive slack paths by applying more aggressive settings to a synthesis/physical optimization tool on the integrated circuit design, without actually performing additional timing optimization on the positive slack paths, determine if the additional margin is sufficient to reduce the timing violation to at least a desired level, perform additional timing optimization on the positive slack paths only when the margin is sufficient, use the margin to manipulate clock skew to reduce the timing violation on the negative slack path, and wherein the step of predicting whether margin can be obtained from a positive slack path is accomplished by analyzing at least two of: a number of cells in the path, types of cells in the path, fanout at each cell input/output pin in the path, drive strength of cells in the path, propagation delay across cells, interconnect delay on nets in the path, maximum delay threshold of cells in the path, and maximum net delay threshold.

* * * * *